3,557,288
CONTROL OF TERRESTRIAL MOLLUSKS
Obren Keckemet, Tacoma, Wash., assignor to Pennwalt Corporation, Philadelphia, Pa., a corporation of Pennsylvania
No Drawing. Filed Mar. 7, 1969, Ser. No. 805,375
Int. Cl. A01n 9/00
U.S. Cl. 424—288      4 Claims

ABSTRACT OF THE DISCLOSURE

Method of controlling terrestrial mollusks using trimethyltin hydroxide as active agent.

---

Terrestrial mollusks such as slugs, snails, and the like are well known enemies of plant cultivation. Mollusks destroy practically all substances of vegetable origin and are both a nuisance and economic hazard to growers of various products, including field crops, citrus fruit growers and particularly, vegetable growers, nurseries and home gardeners. Because mollusks multiply so rapidly they can quickly destroy all the seedlings or devour all the harvest in a cultivated area. It is a known fact that a mollusk can eat its own weight in two days.

In accordance with this invention, there is provided a method for controlling terrestrial mollusks comprising the application to an area to be controlled, a molluskicidal amount of trimethyltin hydroxide.

The active agent used in the invention, trimethyltin hydroxide, is a known compound and may be prepared in accordance with the procedure set forth by Kraus et al., J.A.C.S. 51, 3605 (1929). In preparing the composition of the invention for combating mollusks, a carrier will be mixed with molluskicidal amount of trimethyltin hydroxide, which amount for spot treatments will be preferably in the range of from about 0.01% to about 10% by weight of the total compositon. On a pound per acre basis, from about 0.1 to about 10 pounds per acre of active ingredient will be used. It will be understood that the carrier plus active agent may also embody other materials such as baits for attracting mollusks and other agents may be present such as those which help in the application or distribution of the agent. The carrier may, of course, be a liquid or solid carrier and the compositions may be made in the form of a paste which may be spread on the soil whereby the mollusks come in contact with the composition. In liquid formulations the trimethyltin hydroxide will preferably be dispersed with or without suspending agents in liquid solvents. Where a solid carrier is used, a carrier may be any one of the well-known readily available finely-divided solids such as vermiculties, cellulosic materials, sand, silicates, and the like.

As indicated, the invention is applicable to the control of terrestrial mollusks and it is surprising that trimethyltin hydroxide is specific to this type of organism. Particular mollusks which have been tested and which are responsive to the trimethyltin hydroxide include, but are not limited, to, *Arion ater* (European black slug) *Helix aspersa* (brown garden snail). *Limax maximus* (spotted garden slug), and *Deroceras reticulatum* (grey garden slug).

In order to further illustrate the invention the following examples are given.

EXAMPLE 1

Formulations (A) Typical bait formulation:     Percent
     Trimethyltin hydroxide [1] _____ 0.25
     Bait-carrier [2] _____ 98.75
     Sticker [3] _____ 1.00
                                                            100.00

[1] Dissolved in acetone to facilitate incorporation.
[2] Alfalfa flour, mill run wheat bran, yeast or ground apple pumice.
[3] Polyvinyl alcohol.

(B) Typical solvent formulation:     Percent
     Triemthyltin hydroxide _____ 20
     Xylene _____ 79
     Triton X–161 (surfactant) _____ 1
                                                            100

(C) Typical wettable powder formulation:     Percent
     Trimethyltin hydroxide _____ 25
     Fullers earth _____ 59
     Petro WPX (anticaking agent) _____ 3
     Marasperse N (surfactant) _____ 3
     Ascorbic acid _____ 10
                                                            100

(D) Typical granular formulation:     Percent
     Trimethyltin hydroxide _____ 10
     Ground corn cob _____ 87
     Xylene _____ 3
                                                            100

These formulations can be sprayed, dusted or otherwise applied or can be made into a paste or any other suitable form.

EXAMPLE 2

Evaluations were made at approximately 62° F. Each of three replications consisted of five animals in a testing box constructed with an open arena of moist soil and covered refuge containing wet peat moss. The test baits were formulated on mill-run wheat bran with acetone added to dissolve and incorporate the chemicals. A small pile of bait in the center of the arena was the only source of food for the animals in each test box. Observations were made at regular intervals of numbers of animals lying (usually affected by the chemicals) in the arenas, or dead. Death was determined by tapping the immobile animals with a pencil, animals being recorded as dead if no sign of contraction was seen.

The following Table 1 indicates the data obtained.

TABLE I.—EFFECT OF TRIMETHYLTIN HYDROXIDE FOR CONTROL OF MOLLUSKS

| Mollusk | Concentration of agent, percent | Number of slugs after— | | | | | Percent after 10 days, dead |
|---|---|---|---|---|---|---|---|
| | | 48 hours | | 4 days, dead | 7 days | | |
| | | affected | Dead | | affected | Dead | 10 days, dead | |
| *Helix aspersa* | 2.0 | 3 | 0 | 2 | 2 | 8 | 11 | 73.3 |
| *Limax maximus* | 1.0 | 6 | 0 | 4 | 0 | 14 | 15 | 100.0 |
| | 0.5 | 5 | 0 | 4 | 1 | 11 | 12 | 80.0 |
| | 0.25 | 10 | 0 | 5 | 0 | 14 | 14 | 93.3 |

EXAMPLE 3

Following the procedure of Example 2, the following data in Table II was obtained in the grey garden slug:

TABLE II.—EFFECT OF TRIMETHYLTIN HYDROZIDE ON DEROCERAS RETICULATUM

[Grey garden slug]

| Concentration of Agent | 24 hours | | 48 hours, dead | 6 days | | 70 days dead | Percent dead after 7 days |
|---|---|---|---|---|---|---|---|
| | Affected | Dead | | Affected | Dead | | |
| 1.0 | 10 | 0 | 7 | 0 | 14 | 14 | 93.3 |
| 2.0 | 12 | 0 | 3 | 0 | 14 | 14 | 93.3 |
| 0.5 | 9 | 0 | 2 | 2 | 12 | 14 | 93.3 |
| 0.25 | 1 | 0 | 0 | 1 | 13 | 14 | 93.3 |
| Untreated check | 0 | 0 | 0 | 0 | 1 | 1 | 6.7 |

EXAMPLE 4

Aquatic snails (*Planorbis corneus*) were exposed to trimethyltin hydroxide by adding the formulated agent (5% in water and isopropyl alcohol) to water containing the organisms. The following Table III indicates the results obtained:

TABLE III.—EFFECT OF TRIMETHYLTIN HYDROXIDE ON AQUATIC SNAILS

| | Percent kill | | |
|---|---|---|---|
| Concentration of agent | 24 hours | 48 hours | 72 hours |
| Trimethyltin hydroxide: | | | |
| 2.5 p.p.m | 0 | 0 | 0 |
| 1.0 p.p.m | 0 | 10 | 10 |
| Isopropyl alcohol: | | | |
| 40 p.p.m | 0 | 10 | 10 |
| Untreated check | 0 | 0 | 0 |

It is obvious from the above table that trimethyltin hydroxide has no effect on aquatic slugs. Thus, the tables of data clearly illustrate the unexpected specific effect of trimethyltin hydroxide as a terrestrial molluskicide. This highly specific activity is also evident from tests made on terrestrial mollusks with tetramethyltin and dimethyltin oxide, which compounds were formed to be inactive against *Helix aspersa* at concentrations of 2% active ingredient.

I claim:
1. A method for controlling terrestrial mollusks which comprises contacting said mollusks with a molluskicidal amount of trimethyltin hydroxide.
2. The method of claim 1 where the mollusk is *Helix aspersa*.
3. The method of claim 1 where the mollusk is *Limax maximus*.
4. The method of claim 1 where the mollusk is *Deroceras recticulatum*.

References Cited

UNITED STATES PATENTS

| | | | |
|---|---|---|---|
| 3,284,296 | 11/1966 | Freiberg | 424—288 |
| 3,417,181 | 12/1968 | Cardarelli | 424—288 |
| 3,439,098 | 4/1969 | Freiberg | 424—288 |

OTHER REFERENCES

Chemical Abstracts (I) 57:3870e (1962).
Chemical Abstracts (II) 68:58702a (1968).

JEROME D. GOLDBERG, Primary Examiner